(12) United States Patent
Bass et al.

(10) Patent No.: US 11,746,550 B2
(45) Date of Patent: Sep. 5, 2023

(54) MODULAR MANUFACTURE, DELIVERY, AND ASSEMBLY OF NUCLEAR REACTOR BUILDING SYSTEMS

(71) Applicant: TerraPower, LLC, Bellevue, WA (US)

(72) Inventors: Derek Bass, Wilmington, NC (US); Michael F. Dimitri, Leland, NC (US); Brian C. Johnson, Issaquah, WA (US); Calen Kaneko, Seattle, WA (US); Christopher A. Martin, Seattle, WA (US); Sean T. Mosier, Wilmington, NC (US); Philip M. Schloss, Seattle, WA (US); Nathan Smith, Duvall, WA (US); Mark R. Werner, Bellevue, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 148 days.

(21) Appl. No.: 17/234,581

(22) Filed: Apr. 19, 2021

(65) Prior Publication Data

US 2022/0049516 A1 Feb. 17, 2022

Related U.S. Application Data (60) Provisional application No. 63/066,778, filed on Aug. 17, 2020.

(51) Int. Cl.
| | |
|---|---|
| *E04H 5/02* | (2006.01) |
| *G21C 3/34* | (2006.01) |
| *G21C 3/322* | (2006.01) |
| *G21C 13/028* | (2006.01) |
| *G21C 13/093* | (2006.01) |

(Continued)

(52) U.S. Cl.
CPC ............... *E04H 5/02* (2013.01); *E04B 1/167* (2013.01); *G21C 3/16* (2013.01); *G21C 3/322* (2013.01); *G21C 3/328* (2013.01); *G21C 3/3432* (2019.01); *G21C 13/028* (2013.01);

(Continued)

(58) Field of Classification Search
CPC ... E04H 5/02; E04H 2001/1283; E04H 1/005; E04H 7/02; E04B 1/167
See application file for complete search history.

(56) References Cited

U.S. PATENT DOCUMENTS

| | | | |
|---|---|---|---|
| 3,751,864 A | 8/1973 | Berger et al. | |
| 3,925,679 A * | 12/1975 | Berman | F01K 13/00 290/1 R |

(Continued)

OTHER PUBLICATIONS

PCT/US2021/028007 ISR and WO dated Aug. 6, 2021, 12 pages.

*Primary Examiner* — Gisele D Ford
(74) *Attorney, Agent, or Firm* — FisherBroyles, LLP; Jeremy P. Sanders (57) ABSTRACT

A nuclear reactor is constructed in sub-modules and super modules which are manufactured, packaged, and shipped to a construction site. At least some of the modules are packaged in suitable shielding containers or portions of containers, which may be steel. The modules are assembled on-site, and some of the modules remain within their respective shipping containers after assembly. One or more of the shipping containers may be used as concrete forms to support the pouring of concrete in between selected modules. The concrete may be used for structural support, shielding, or both.

12 Claims, 9 Drawing Sheets

(51) Int. Cl.
*G21C 13/10* (2006.01)
*G21C 15/18* (2006.01)
*G21C 3/16* (2006.01)
*G21C 3/328* (2006.01)
*G21C 21/02* (2006.01)
*E04B 1/16* (2006.01)

(52) U.S. Cl.
CPC .......... *G21C 13/093* (2013.01); *G21C 13/10* (2013.01); *G21C 15/18* (2013.01); *G21C 21/02* (2013.01)

(56) References Cited

U.S. PATENT DOCUMENTS

| | | | | |
|---|---|---|---|---|
| 4,117,342 | A * | 9/1978 | Melley, Jr. | B60P 3/00 290/1 A |
| 4,508,677 | A | 4/1985 | Craig et al. | |
| 5,474,411 | A * | 12/1995 | Schoenfeld | E04B 1/34807 52/234 |
| 5,761,854 | A * | 6/1998 | Johnson | B60P 3/34 52/79.5 |
| 5,785,591 | A * | 7/1998 | Payne | B65D 90/00 454/91 |
| 6,016,634 | A * | 1/2000 | Sayer | E04B 1/2403 52/648.1 |
| 6,155,747 | A * | 12/2000 | Payne | B65D 90/0013 588/259 |
| 6,393,775 | B1 * | 5/2002 | Staschik | F24D 11/005 210/241 |
| 6,688,048 | B2 * | 2/2004 | Staschik | F24D 11/005 52/220.1 |
| 9,212,499 | B1 * | 12/2015 | Maurer | H02B 7/06 |
| 9,376,801 | B1 * | 6/2016 | Warren | E04H 5/00 |
| 9,957,708 | B2 * | 5/2018 | Brewer | B65D 90/0086 |
| 10,079,526 | B2 * | 9/2018 | Shatek | F01P 11/04 |
| 10,202,896 | B2 * | 2/2019 | Brewer | H02J 3/381 |
| 10,260,409 | B2 * | 4/2019 | Johnson | F02B 63/044 |
| 10,914,478 | B2 * | 2/2021 | Miller | F24F 13/30 |
| 11,125,156 | B2 * | 9/2021 | Zhang | H02K 7/1823 |
| 11,407,582 | B2 * | 8/2022 | Hirsh | B65D 90/24 |
| 2001/0003242 | A1 * | 6/2001 | Takamatsu | F01D 25/28 60/802 |
| 2002/0189173 | A1 * | 12/2002 | Staschik | F24D 18/00 52/79.1 |
| 2007/0094946 | A1 * | 5/2007 | Schoeny | E04H 5/02 52/79.1 |
| 2008/0022606 | A1 * | 1/2008 | Akagi | E02D 27/44 52/79.11 |
| 2008/0123288 | A1 * | 5/2008 | Hillis | H05K 7/20745 361/679.54 |
| 2009/0077904 | A1 * | 3/2009 | Ziegler | E04B 1/3483 52/745.13 |
| 2010/0300013 | A1 * | 12/2010 | Imaoka | E04G 21/14 52/79.9 |
| 2011/0258837 | A1 * | 10/2011 | Scannon | E04B 1/343 29/33 R |
| 2013/0233388 | A1 * | 9/2013 | Utal | F17D 1/04 137/1 |
| 2014/0053599 | A1 * | 2/2014 | Byfield | F25J 1/0022 29/890.035 |
| 2014/0130422 | A1 * | 5/2014 | Laing | F01D 25/24 52/79.5 |
| 2014/0137486 | A1 * | 5/2014 | Driess | E04H 5/00 52/745.03 |
| 2014/0298745 | A1 | 10/2014 | Rechenmacher et al. | |
| 2015/0240474 | A1 * | 8/2015 | Kokoschka | E04B 1/34384 52/745.02 |
| 2015/0354201 | A1 * | 12/2015 | Gruetering | E04H 5/02 52/745.02 |
| 2016/0010916 | A1 * | 1/2016 | Byfield | F28B 1/06 62/611 |
| 2016/0273211 | A1 * | 9/2016 | Brewer | H02K 7/1807 |
| 2016/0369689 | A1 * | 12/2016 | Brewer | H02K 7/1815 |
| 2017/0199505 | A1 * | 7/2017 | Harper | E04H 5/02 |
| 2017/0260763 | A1 * | 9/2017 | Fortin | E04H 5/00 |
| 2017/0321443 | A1 * | 11/2017 | Biffiger | E04H 5/02 |
| 2018/0123349 | A1 * | 5/2018 | Gleave | F02B 63/044 |
| 2018/0171653 | A1 * | 6/2018 | Birch | E04H 5/02 |
| 2018/0209136 | A1 * | 7/2018 | Aylward | E04H 1/005 |
| 2018/0251292 | A1 * | 9/2018 | Marchini | E04H 5/04 |
| 2018/0328056 | A1 * | 11/2018 | Collins | E04B 1/2403 |
| 2019/0024365 | A1 * | 1/2019 | Lestini | E04B 1/34861 |
| 2019/0055887 | A1 * | 2/2019 | Giancotti | F25J 1/0022 |
| 2019/0353081 | A1 * | 11/2019 | Sarder | F01P 1/02 |
| 2020/0309450 | A1 * | 10/2020 | Morley | F25J 1/0244 |
| 2021/0239038 | A1 * | 8/2021 | Jewhurst | F02B 63/044 |
| 2021/0404378 | A1 * | 12/2021 | More | F02B 63/04 |
| 2022/0049491 | A1 * | 2/2022 | Yoshitaka | E04B 1/2403 |
| 2022/0088559 | A1 * | 3/2022 | Yeo | G21F 9/22 |
| 2022/0098886 | A1 * | 3/2022 | More | E04H 5/02 |
| 2022/0106784 | A1 * | 4/2022 | Igarashi | E04H 5/02 |
| 2022/0106802 | A1 * | 4/2022 | Terakubo | E04H 5/02 |
| 2022/0106803 | A1 * | 4/2022 | Mahlanen | E04B 1/8209 |

* cited by examiner

MODULAR MANUFACTURE, DELIVERY, AND ASSEMBLY OF NUCLEAR REACTOR BUILDING SYSTEMS

CROSS-REFERENCE TO RELATED APPLICATIONS

This application claims the benefit of U.S. Provisional Patent Application No. 63/066,778, filed Aug. 17, 2020, entitled "MODULAR MANUFACTURE, DELIVERY, AND ASSEMBLY OF NUCLEAR REACTOR," the contents of which is incorporated herein by reference in its entirety.

BACKGROUND

Nuclear reactors are largely built on site with smaller components assembled in a manufacturing facility and shipped to the site for installation and connection. There is a significant amount of work that goes into siting a nuclear reactor, including excavation, tons of concrete poured as shielding, support work, and structural components. According to some estimates, the cost of nuclear reactor construction has doubled, or even tripled, over the past decade due to regulation, a reduced number of vendors capable of supplying the necessary materials, and the rising material cost.

Furthermore, labor costs have also increased over time as the precision required for nuclear reactor component construction and assembly drives a considerable amount of the time and expense of construction. Many of the components that are assembled have tight tolerances in their connections to other components and/or location relative to other components. Needless to say, construction of a nuclear reactor is very time and cost intensive.

It would be advantageous if the process of constructing a nuclear reactor could be more time and cost efficient while maintaining, or even increasing, the level of precision in fabricating and locating the delicate components, systems, and structures required by a nuclear reactor construction project.

SUMMARY

In some embodiments, a method of constructing a nuclear reactor includes the steps of receiving a first nuclear reactor component in a first steel container; receiving a second nuclear reactor component in a second steel container; placing the second steel container in proximity to the first steel container; and pouring concrete between the second steel container and the first steel container, the second steel container and the first steel container used as forms to contain poured concrete.

In some cases, the first nuclear reactor component remains within the first steel container during operation of the nuclear reactor. The method may include attaching one or more form ties between the first steel container and the second steel container. In some cases, this provides rigidity of the steel containers to support concrete being placed therebetween.

The method may further include excavating the earth to create a subgrade region. In other words a hole may be formed in the earth, such as by digging, drilling, boring, tunneling, or other earth moving process and a region below grade may be provided, such as for housing one or more components or systems of the nuclear reactor. In some cases, the excavating is performed by drilling, such as by a drilling or vertical boring machine.

The method may further include placing the first steel container in the subgrade region. In some examples, the method includes the step of connecting the first steel container to the second steel container and wherein placing the first steel container in the subgrade region may be performed after the step of connecting the first steel container to the second steel container.

In some cases, the step of connecting the first steel container to the second steel container comprises welding form ties between the first steel container and the second steel container. In some examples, the step of connecting the first steel container to the second steel container comprises coupling the containers with one or more fluid conduits. For example, fluid conduits may be provided between two or more steel container to allow modules or equipment within the steel containers to be fluidically coupled to modules or equipment located in other steel containers.

According to some embodiments, a method of constructing a nuclear reactor includes the steps of fabricating one or more sub-modules in a manufacturing facility, the one or more sub-modules comprising a skid and a shielding; assembling one or more sub-modules into one or more super modules using temporary connections at the manufacturing facility; disassembling the super modules; and transporting the sub-modules to an installation site.

The method may further include, at the installation site: assembling two or more sub-modules using permanent connections; installing concrete form ties between the two or more sub-modules; welding the two or more sub-modules together to create a super module; pouring concrete between the two or more sub-modules; and installing the super module in place.

In some instances, the one or more sub-modules may include one or more of a compressor module, a tank module, and a charcoal bed module. In some cases, the shielding is made up of multiple pieces and further comprising the step of, at the installation site: welding the multiple pieces of shielding to the sub-module.

In some examples, the step of transporting the sub-modules to the installation site comprises shipping the sub-modules by truck.

In examples, a first submodule of the one or more submodules has a steel container permanently formed around the first submodule, the steel container having a preformed aperture. For example, the first submodule may include a pipe coupled to the preformed aperture. Similar preformed apertures in other steel containers may allow the first submodule to be in communication with a second submodule, such as by fluid communication, electrical communication, or other forms of communication.

According to some embodiments, a construction method includes the steps of fabricating, at a manufacturing facility, a first sub-module, the first sub-module positioned within a first container; fabricating, at the manufacturing facility, a second sub-module, the second sub-module positioned within a second container; shipping the first sub-module and the second sub-module to a construction site; placing the first sub-module and the second sub-module in place, the first container and the second container remaining in place; coupling the first container and the second container together; and placing concrete between the first container and the second container.

In some cases, the first container is a steel container. The first container may have a pre-formed opening to provide a pathway through the first container.

The construction method may include the step of connecting form ties in between the first container and the second container.

In some examples, the step of coupling the first container and the second container together comprises fluidically coupling the first container and the second container together.

DETAILED DESCRIPTION

This disclosure generally relates to methods and systems that allow components of a nuclear reactor to be manufactured under a controlled environment, such as in a factory, packaged and shipped into modules, and then assembled on-site. In some cases, sub-modules are manufactured and packaged prior to shipping, while in other cases, super-modules are manufactured, packaged, and shipped as an assembly.

In some cases, the modules are packaged in shipping containers. The shipping containers may be steel. In some cases, the shipping containers remain in place once the modules are assembled. In some instances, the shipping containers serve as concrete forms that facilitate pouring concrete in between selected modules. The concrete may be poured in between modules for containment, structural considerations, or a combination.

In some cases, one or more form ties are placed in between concrete forms. The form ties may be bolted, welded, adhered, attached, or otherwise affixed to the concrete forms to promote the concrete forms remaining in a desired arrangement, spacing, and/or orientation while the concrete is poured and cured.

In some embodiments, the modules are sized to be adapted to commercial transportation, such as by trucking, ocean going vessels, trains, or other suitable commercial transport options. For example, in some cases, the components are arranged to result in modules that are able to fit within shipping containers, such as standard cargo or freight containers less than about twenty feet in width, or less than about 10 feet in width, or less than about 102" in width, or less than about 8 feet in width.

In some cases, at least some of the modules are place below grade, while other modules are placed above grade. In some instances, the nuclear core is placed below grade and other structures are placed at or above grade.

For example, some of the modules, such as those that typically require containment structures, may be placed below grade and the surrounding earth may participate in the containment requirements, in combination with other containment structures. For example, some of the below-grade modules may be surrounded at least partially by concrete, or other suitable containment materials, and are further surrounded by earth.

The following description refers to various modules as examples of ways to implement to unique manufacturing, shipping, packaging, transport, assembly, and construction of industrial building sites, such as a nuclear reactor site. However, many of the techniques discussed herein are not only implementable with a nuclear reactor site and may be applicable to any of a number of construction projects. The exemplary modules and description herein should not be limiting of the scope of invention.

Figure 1:
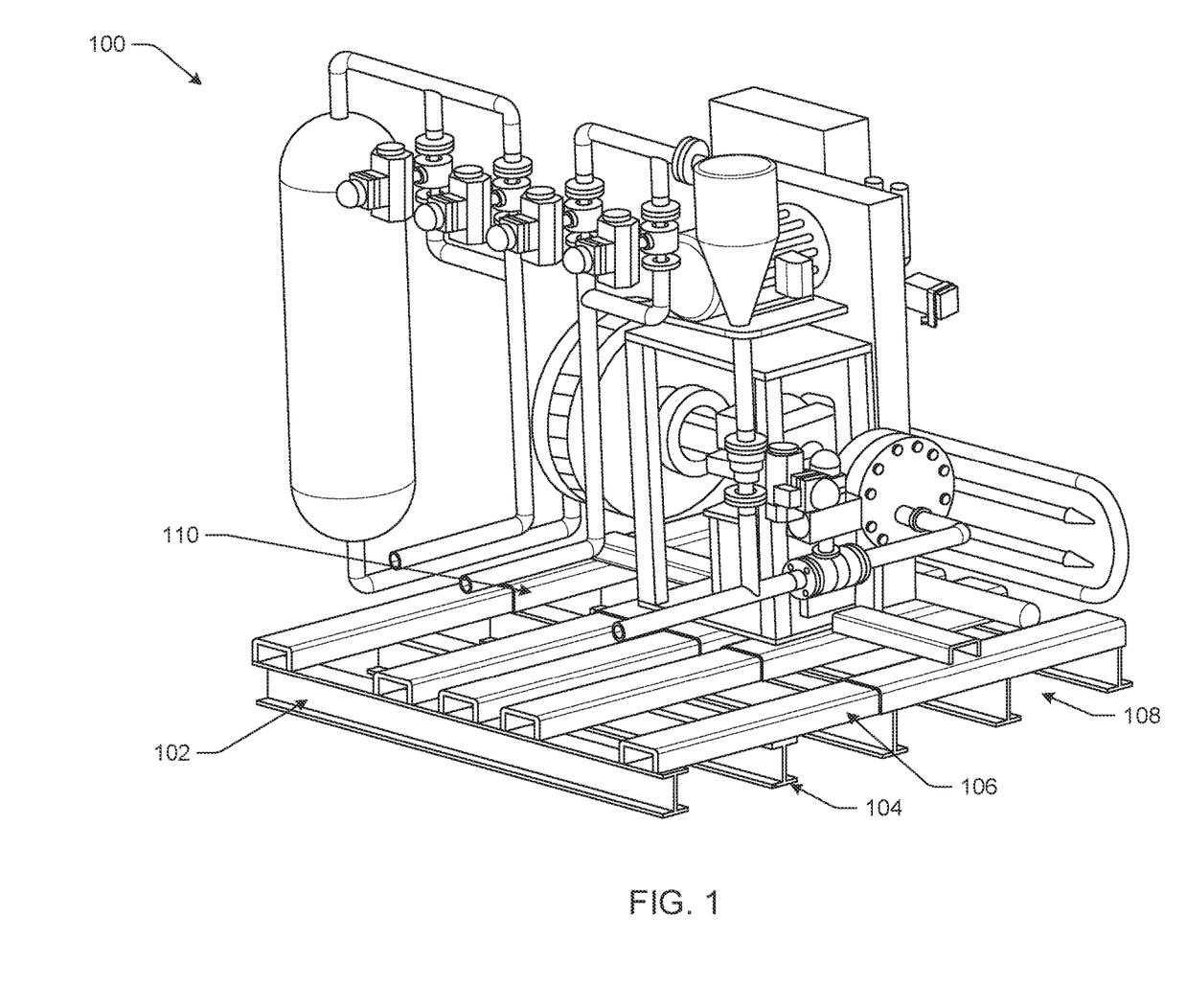
FIG. 1 is a schematic representation of a compressor module, in accordance with some embodiments.

FIG. 1 shows a sample compressor module 100 that can be used with a nuclear reactor, such as in the context of a cover gas cleanup system. The compressor module 100 is only used as an example, as any of a number of modules may be provided according to embodiments described herein. In some embodiments, one or more components, structures, or systems ("SSCs") are manufactured or assembled as modules and shipped to a nuclear site for installation. As illustrated, the compressor module 100 is mounted to a skid 102. The skid may be any suitable configuration, but in some embodiments, includes base members 104 supporting cross members 106. The base members 104 and cross members 106 may be formed of any suitable material, such as steel, iron, or some other metal, alloy, or combination of materials. In some cases, the skid 102 is manufactured of a material suitable for use within a nuclear reactor building and is capable of withstanding a dose limit according to its intended location and use.

In some embodiments, the base member 104 are formed as I-beams, of course other configurations are entirely possible. In some cases, the cross members 106 are formed as C-channels. Of course, either the base members 104 or cross members 106 may have any suitable cross-sectional shape to provide support to the module attached thereto.

The skid 102 may define channels 108 that permit lifting equipment to extend under the skid to lift the module 100, such as by a forklift, high lift, crane, pallet jack, and the like.

The compressor module 100 may include a base 110 that is configured to mount to the skid 102. As illustrated, in some embodiments, the base 110 is shaped to cooperate with the cross member 106 in a nesting arrangement. For example, the base 110 may be formed as a C-channel that is slightly wider than the cross member 106, such that the cross member 106 fits within the base member 110. The cross member 106 and base member 110 can be coupled through any suitable technique, such as, for example, any of a number of fasteners, adhesives, welding, or any combination of connection mechanisms.

The compressor module 100 may be situated within the nuclear reactor to allow overhead access to the module once installed. The compressor module 100 may additionally include any other components coupled to the compressor module, such as, for example, monitoring or control equipment.

The compressor module 100 may be manufactured or assembled in a factory under controllable conditions that allow precision manufacturing and tight tolerances. The compressor module 100 may be permanently attached to the skid during the manufacturing process and crated for shipping to the nuclear reactor construction site. Upon arriving at the site, the compressor module 100 may be lifted, such as with a gantry crane, and set into place with the skid 102 still attached. The skid 102 may include one or more flanges that allow the skid 102 to be mounted to a support, such as a concrete floor to inhibit unintentional movement of the skid 102 or compressor module 100. In some examples, the compressor module is sized and configured for land, sea, and/or air transport. For example, the compressor module may be approximately 7.5 ft wide by 7.5 ft long by 8 ft high, and weigh on the order of 3,500 lbs. These dimensional and weight details are provided as an example module that is configured to be constructed and assembled, and subsequently be delivered and placed in its permanent place without substantial manufacture or assembly at the construction site. Of course, other dimensions and weights of modules are contemplated herein, and any dimensions and weights are only provided as an example.

In some cases, the compressor module 100, or any module associated with a nuclear reactor, may be located within a shielded room designed and designated for equipment. The construction of a shielded room will be described in further detail herein in relation to the modules.

Figure 2A:
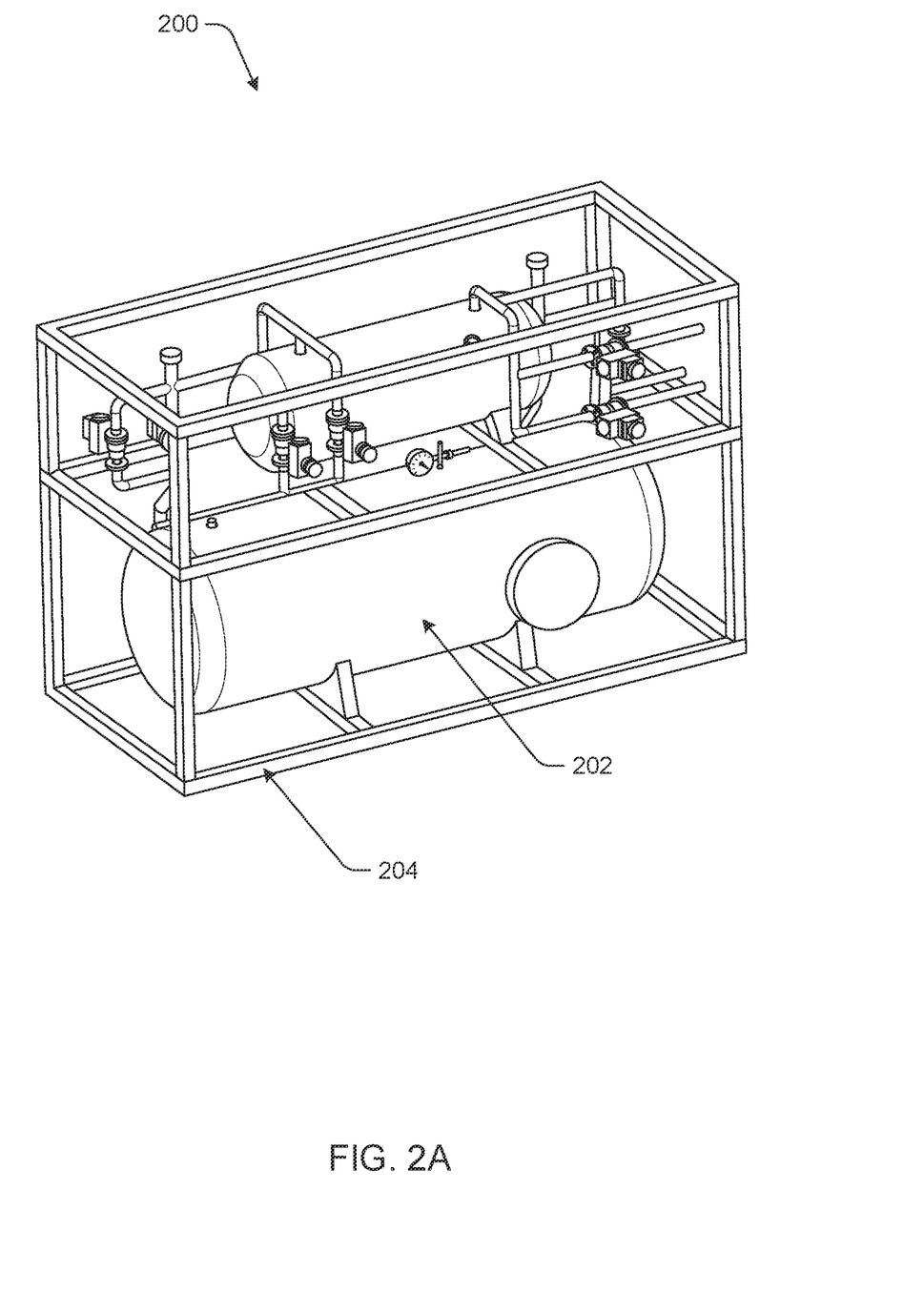
FIG. 2A is a schematic representation of a tank module, in accordance with some embodiments.
Figure 2B:
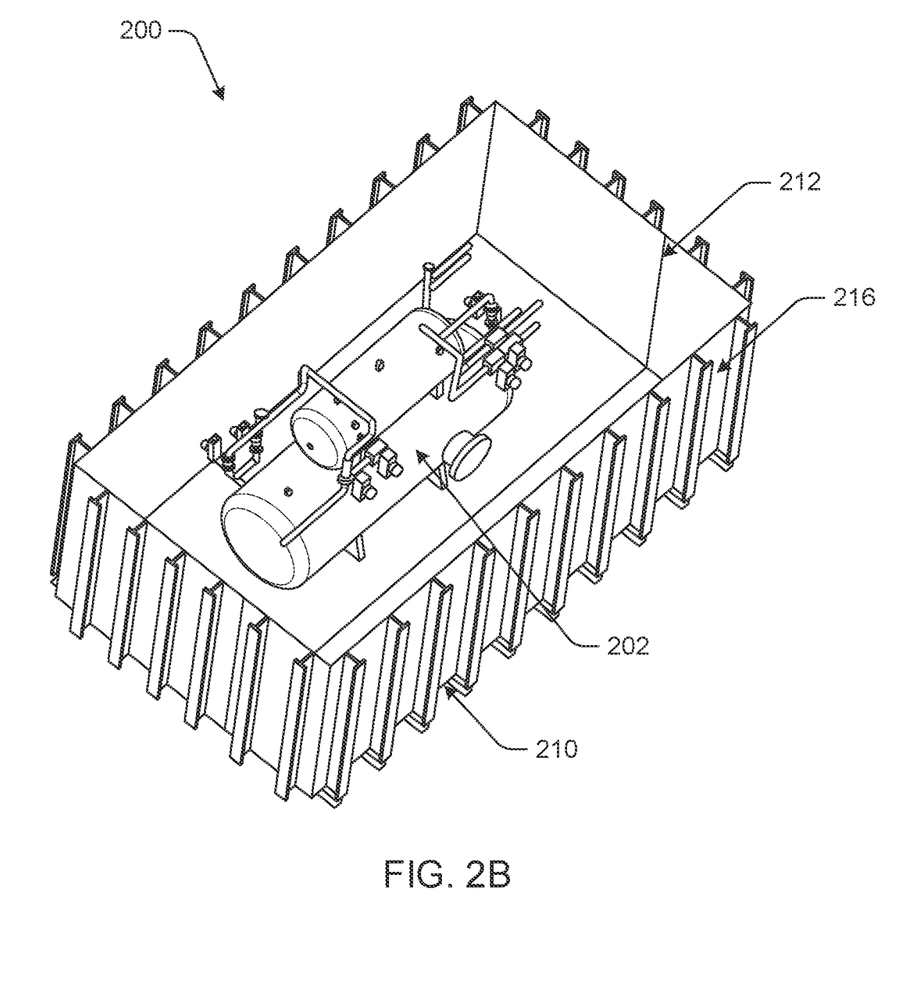
FIG. 2B is a schematic representation of a tank cell, including a tank module and surrounding cell; in accordance with some embodiments

FIGS. 2A and 2B illustrates a tank module 200 that may be used in conjunction with a nuclear reactor and is configured for permanent placement at a nuclear reactor site. In some cases, the tank module 200 includes one or more tanks 202 and may be used for any suitable purpose, such as vacuum tanks, surge tanks, delay tanks, compressor tank, or other suitable use. The tanks 202 may be oriented vertically or horizontally (as shown). In some cases, the one or more tanks 202 are oriented horizontally which provides advantages for crating, shipping installing, and further allows for a significant amount of piping and valving to be installed and mounted on a prefabricated skid 204 during manufacture and prior to shipping to the construction site.

The skid 204 may be any suitable construction and materials, and in some cases, the tank module 200 is permanently mounted to the skid 204. The skid may provide access for lifting equipment to lift and place the tank module 200 in a suitable location. The skid 204 may include a cage around at least a portion of the tank module 200 and may have open sides to allow access to the tank module, such as for control, repair, or maintenance. According to some embodiments, the tank module 200 is prefabricated in a factory with the skid, piping, and valving prior to shipping. Constructing the tank module 200 in this manner alleviates additional piping and valving construction or assembly at the construction site and increases the assurance that the piping and valving is correctly coupled to the tank module 200. In many cases, orienting the tanks horizontally, as illustrated, simplifies shipping of the tank module 200.

FIG. 2B illustrates a tank module 200 integrated into a cell 210. The cell 210 may be formed as an inerted cell steel liner that can be used as at least a portion of a shipping container, and in some cases, is referred to as a shipping container. The cell 210 may also be used as a concrete form in order to support pouring of liquid concrete. In some cases, the cell 210 is formed in two or more pieces, the separation of at least two pieces shown by the parting line 212. In some cases, the total dimensions of the cell 210 may make transporting the entire assembled cell difficult. Accordingly, the cell 210 may be formed as two or more separate pieces, and a first piece 214 may be permanently attached to the tank module 200, such as at a factory, and may be used to support the tank module 200 during transport to the construction site. The first piece 214 may be used as a portion of the shipping container or may be placed inside a crate for transport. The second piece 216 may be shipped separately and attached to the first piece 214 at the construction site through any suitable method or combination of methods, such a bolting, welding, or other process. The cell 210 may additionally be formed with a top (e.g. plug, not shown) that encloses the tank module 200 for transport and may be used at the construction site for radiation shielding for the tank module 200.

The tank module 200 in combination with fully assembled cell 210 form a super module. In some cases, the tank super module may be on the order of about thirteen feet wide. To facilitate transport, such as by by rail or truck, the entire width of the module in a shipped configuration may be about 8 feet wide. The cell 210 may be configured to be separated into two or more pieces such that the largest piece is less than about 8 feet wide to facilitate commercial transport. In some cases, the largest piece of the tank super module is on the order of 8.5 feet wide.

Other equipment that may be included with the tank module 200 and fabricated and installed to the module prior to transport include, without limitation, vacuum tanks, surge and delay tanks, automatic flow control valves, automatic isolation valves, and piping. Of course, this list is exemplary and is not limiting to the components, structures, or systems that can be included in the tank module 200 prior to transport.

Figure 3:
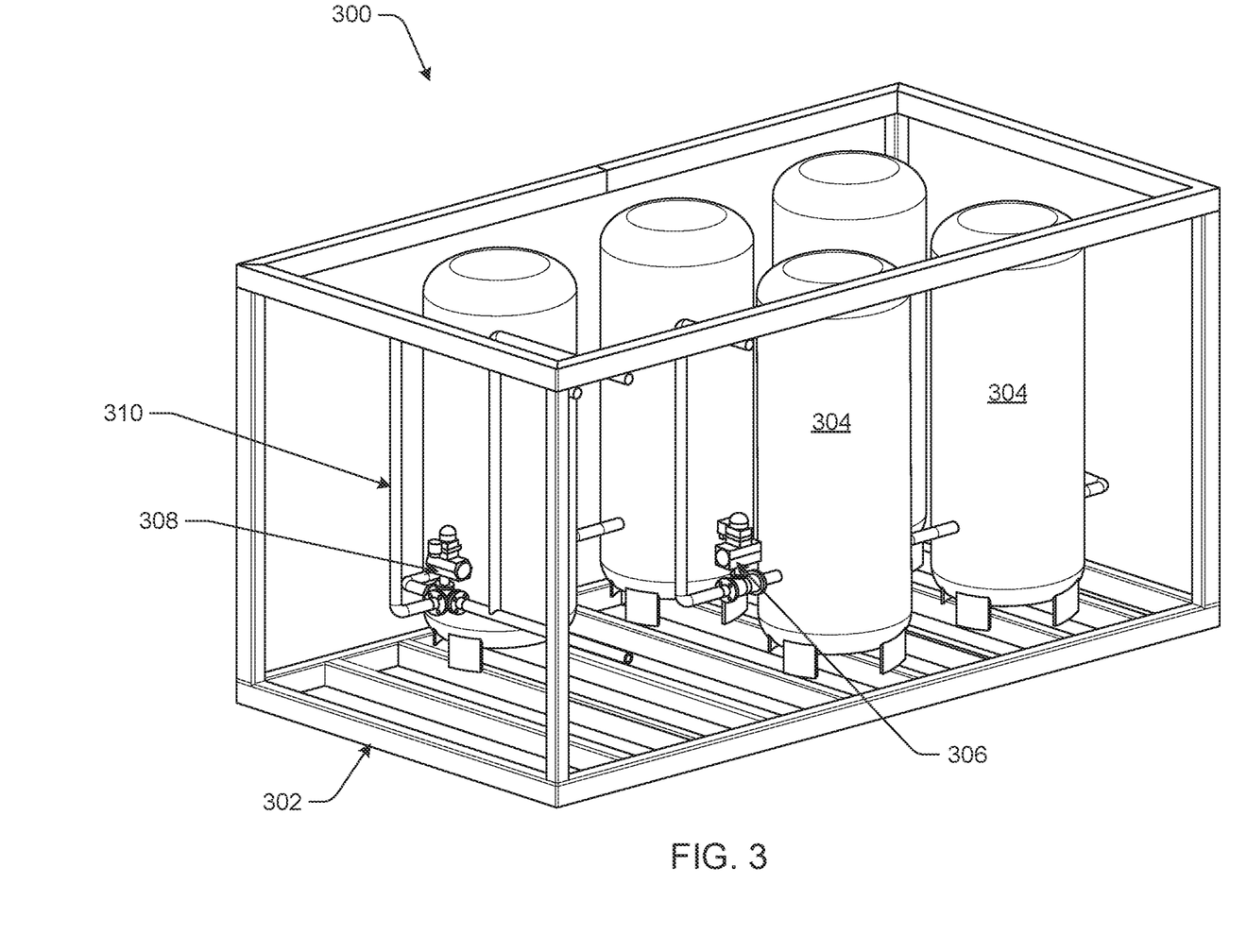
FIG. 3 is an illustration of a charcoal bed module, in accordance with some embodiments.

FIG. 3 illustrates another example module, a charcoal delay bed module 300. The charcoal delay bed module 300 may be fabricated with an integrated skid 302 configured to be permanently coupled to the components of the charcoal delay bed module 300. As previously described with other modules, the skid 302 may be formed of any suitable material and configuration, and be coupled to the components, systems, and structures of the charcoal delay bed module 300. The skid 302 may facilitate transport, and may include enclosed sides, such as illustrated in FIG. 2B with the tank module 200. The enclosed sides of the skid 302 may be used as concrete forms to facilitate pouring concrete shielding around at least a portion of the charcoal delay bed module 300. The skid 302 may optionally include a top for sealing the charcoal delay bed module 300 for transportation.

Other components, structures, and systems may be included with the charcoal delay bed module 300 during fabrication prior to shipping, and may include, without limitation, tanks 304, control valves 306, isolation valves 308, piping 310, among other components. An overall size of the charcoal delay bed module 300 and skid 302 may facilitate transport, and in some cases, is on the order of about 8.5 ft wide, 17.5 ft long, and 9 ft high. In some examples, a charcoal delay bed module 300 weighs on the order of about 32,000 lbs. Of course, the provided size and weight are examples only, and the size may be scaled up or down, or separated into multiple modules depending on the designed flow conditions through the charcoal delay bed module 300.

Figure 4:
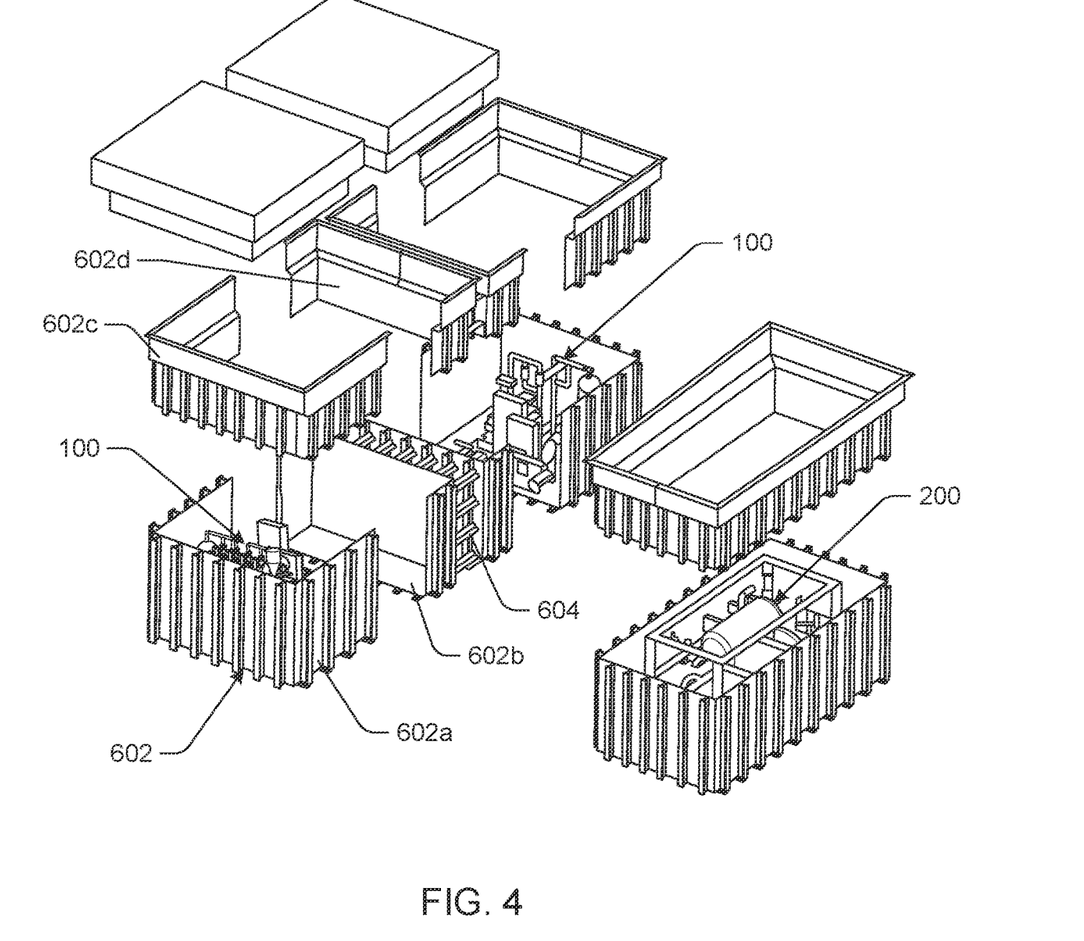
FIG. 4 is an illustration of several modules being assembled on site to form super modules, in accordance with some embodiments.
Figure 5:
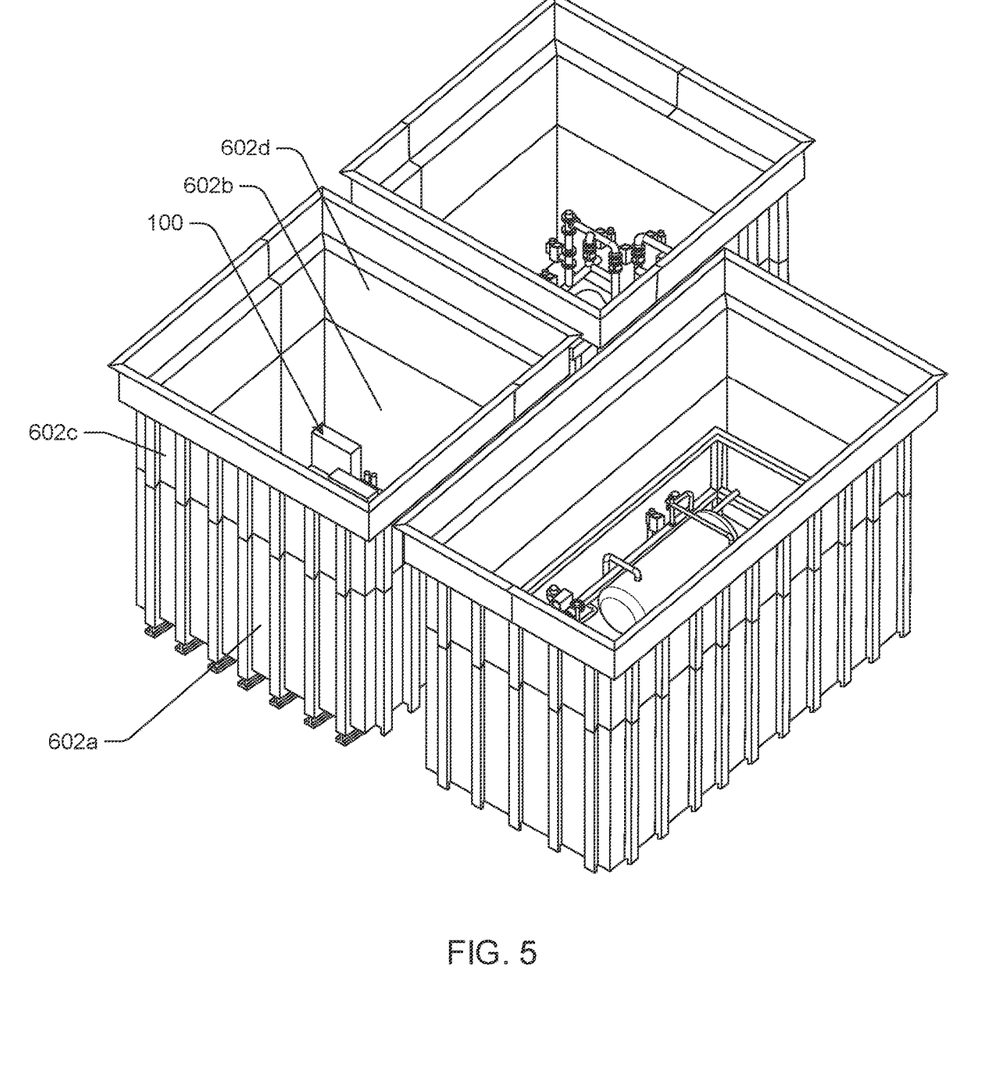
FIG. 5 is an isometric view of super modules as in FIG. 4, in accordance with some embodiments.
Figure 6:
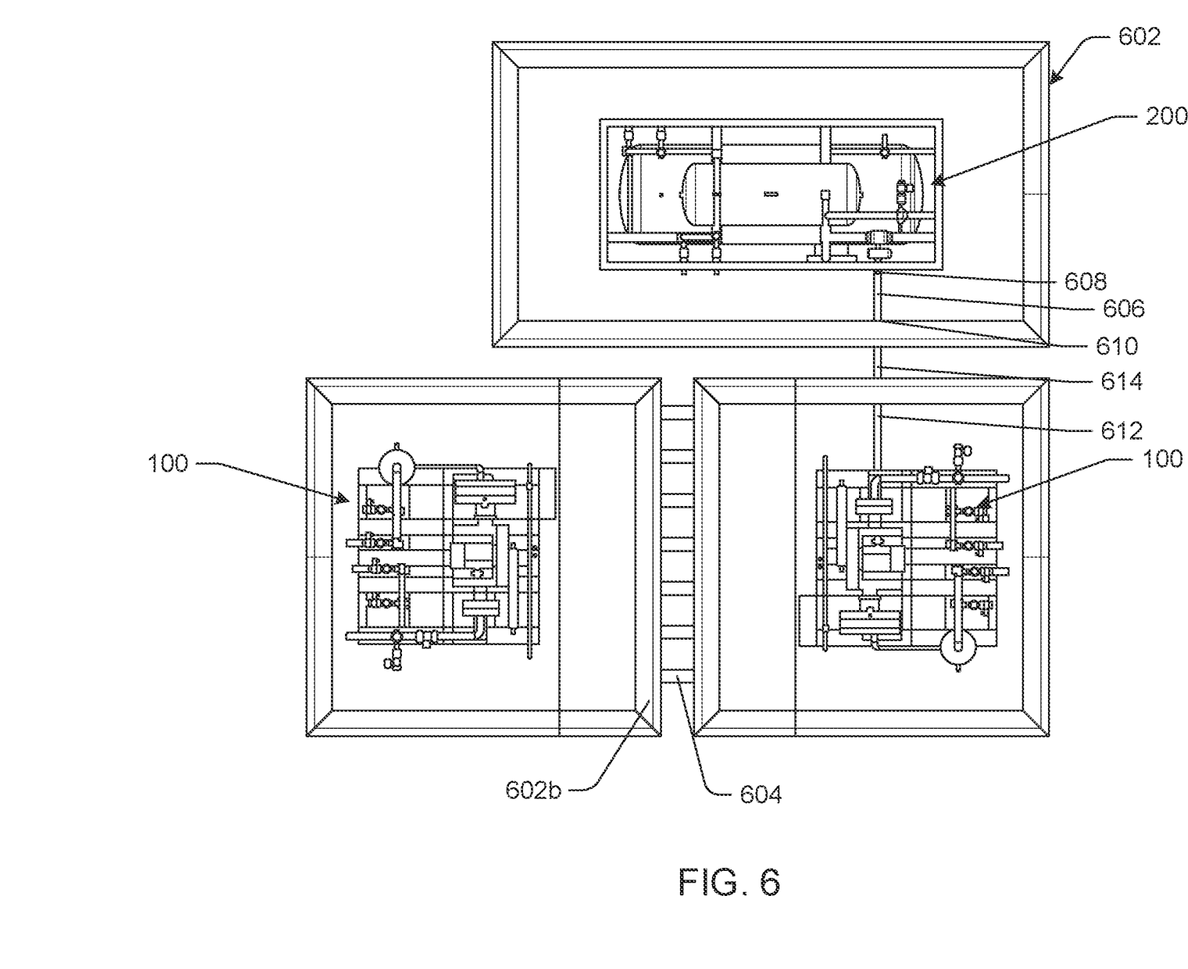
FIG. 6 illustrates a top view of several super modules set in place with concrete form ties, in accordance with some embodiments.

FIGS. 4, 5, and 6 illustrate a plurality of modules that can be assembled on site to form cells for the components, structures, and systems associated with the construction project. For example, one or more compressor modules 100 can be positioned appropriately for the project by placing the module, with the skid and compressor cell 602 already assembled. The compressor cell 602 may be formed of multiple pieces 602a, 602b, 602c, 602d, which may be joined together at the construction site. The fully assembled module and cells may be referred to as super modules, which is created by assembling sub-modules. As used herein, a super module is one or more sub-modules that are assembled at a construction site prior to placing the super module in its final location. For example, as illustrated in FIG. 4, a compressor super module is made up of the compressor module 100 with attached skid, and a cell formed of separate pieces, such as a $1^{st}$ cell piece 602a, $2^{nd}$ cell piece 602b, $3^{rd}$ cell piece 602c, and $4^{th}$ cell piece 602d. In some cases, the super module is formed of sub-module pieces that are more convenient for shipping than the entire assembled super module cell 602.

The modules may ship through a standard carrier with all, or a portion of, a cell 602, and be assembled on-site into a super module. A cell 602 may be a crate, box, or other member, or a portion thereof that can be used to support and protect a sub-module during transport, during installation, and may further be used to provide shielding, such as radiation shielding, and may further be used as a concrete form.

In some cases, a module is fabricated and mounted into a cell (or portion of a cell) prior to transport and can be set into an appropriate place at the construction site. One or more cells, such as adjacent cells, can be spaced apart and the cells used as concrete forms to pour concrete between the cells, such as for structural purposes, radiation shielding, or some other purpose.

The cells define an inner surface and an inner volume into which the module is mounted, and an outer surface that can be used as a concrete form. A concrete form is a solid barrier that helps to hold fluid concrete in place as it is poured until it hardens. The cells may be coupled together, such as with form ties 604, to encourage the cells to remain in their designated places while liquid concrete is poured or pumped in between the cells and allowed to harden.

The form ties 604 may be any suitable material, such as any suitable metal, plastic, composite, or combination of materials. In some cases, the form ties are steel. The form ties may be any suitable configuration, such as bolts that couple adjacent cells together, straps, bars, or some other suitable configuration that can be coupled to adjacent cells and transmit loads in tension between the adjacent cells during concrete pouring and curing. In some embodiments, two or more adjacent cells are coupled together with form ties 604 that are welded in between the cells to maintain relative spacing between the adjacent cells.

The cells 602 may have preformed openings therein to allow a conduit to provide communication from one cell to a second cell. For example, a pipe 606, such as a fluid flow pipe, may have a first end 608 fluidically coupled to a module within a cell, and the pipe may have a second end 610 coupled to the wall of the cell 602, such as by a flange or other suitable coupling. The cell 602 may define an opening to allow for fluid to exit the cell through the opening. Another cell 602 may have a similar preformed opening and piping 612 within the cell that couples to the preformed opening. Before or after the cells are positioned in their final locations at the construction site, a connecting pipe 614 may be installed between the cells at the respective apertures to provide fluid communication between the cells through the preformed openings and the piping. Similar preformed openings may be provided to allow communication between two or more cells, such as fluid communication, electrical communication, thermal communication, and/or additional couplings to allow the systems to function and interact as desired.

According to some embodiments, a module, such as a compressor module 100 is fabricated at a manufacturing facility, is mounted to a skid, and further mounted within at least a portion of a cell 602a. The module 100 may then be transported to the construction site, where another portion of the cell 602b may be affixed through any suitable process, such as welding. The cell may further include additional portions of the cell, such as a first upper 602c and a second upper 602d that can be selectively coupled to the first piece 602a and second piece 602b. In some instances, a portion of a cell, such as 602b, may be used to provide shielding to more than one cell as it can be coupled to two or more cells and have integrated concrete form ties 604 to provide spacing for concrete to be poured. As shown, cell portion 602b can be coupled to two compressor cells 100 and provide a fixed space between the two compressor cells 100 for concrete to be poured. In some cases, the distance between cells is on the order of 36", or 40", or 44", or 48", or some other suitable distance to provide sufficient space for concrete based upon structural and/or radioactive shielding requirements.

In some cases, the completed cell is too large for efficient shipping, and the cell can be fabricated into manageably sized pieces for transport, and the cell can be completed on-site. In some cases, multiple pieces of the cell are welded, bolted, adhered, or a combination to complete the cell in place and one or more cells can be used as concrete forms to position, shape, and retain the liquid concrete while it sets and cures.

FIG. 6 illustrates a top view of the cells of FIG. 5 and illustrates one tank module 200 and two compressor modules 100 positioned in respective cells. Concrete form ties 604 are shown as attached in between adjacent cells to provide tension support from the hydrostatic forces imparted to the cells from liquid concrete. The concrete may be poured in between adjacent cells, or around selected cells to provide radiation shielding, and in some cases, is not needed for structural support. Accordingly, the design of the concrete pour may be based upon shielding requirements and not structural requirements for the structure in which the module is located.

Of course, numerous other modules are contemplated as being able to be fabricated at a manufacturing facility, mounted on skids and placed in a cell with shielding prior to transport. Examples of additional modules include, without limitation, isolation and bleed valve cells, sampling and monitoring cells, vapor trap cells, compressor and cover gas monitoring cells, vacuum and surge and delay tank cells, charcoal delay bed cells, activation product traps, fission product traps, freeze vent cells, pipe chase cells, and others.

In some embodiments, the cells can be enclosed from all sides, including the top, such as with a plug or hatch, and the top of one or more cells may be used as a walkway once the cells are set in place at the construction site.

By fabricating sub-modules off site, it transitions the skilled labor from on-site fabrication, or in-the-hole fabrication work, to more efficient off-site factory fabrication work. Assembling the super modules on-site transitions the skilled labor that might otherwise be in-the-hole fabrication to more efficient on-site fabrication. As used herein, in-the-hole fabrication refers to fabrication occurring once equipment has been positioned in place, which may be below grade, where access is more difficult and it also becomes more difficult to move, shift, or adjust the components to ensure proper alignment or fit. In contrast, on-site fabrication occurs before components are put into place. For example, sub-modules can be connected together on grade, which offers the benefits of unobstructed access, and then positioned into place, including sub-grade placement, once the sub-modules are assembled into super modules.

According to some embodiments, a module may be broken down into smaller parts for transport, and in some cases, a steel cell designed to surround the module is broken into separate pieces, such as for accommodating transport size restrictions. In many cases, the cell is assembled on site around the module and is then left in place while the module is coupled to other modules and positioned in place.

The separation of super modules into sub-modules, as described, allows the shielding requirements for each of the modules to be constructed separately from the building into which the modules are to be installed. This increases modularity in construction of a nuclear reactor and allows the modules to be located in any of a number of reactor buildings without the need for designing the civil works and the buildings to specifically house the modules.

For example, a generic room in a building at a nuclear construction site can support any of a number of modules and super modules without the requirement to design the room to specifically house the modules. Similarly, identical module designs can be used in multiple different construction sites without requiring specific building or room construction designs and civil works to support the modules. As a further example, a module can be removed from the nuclear site and replaced with another module having a different configuration without impacting the remaining modules, or the civil works in the building.

Figure 7:
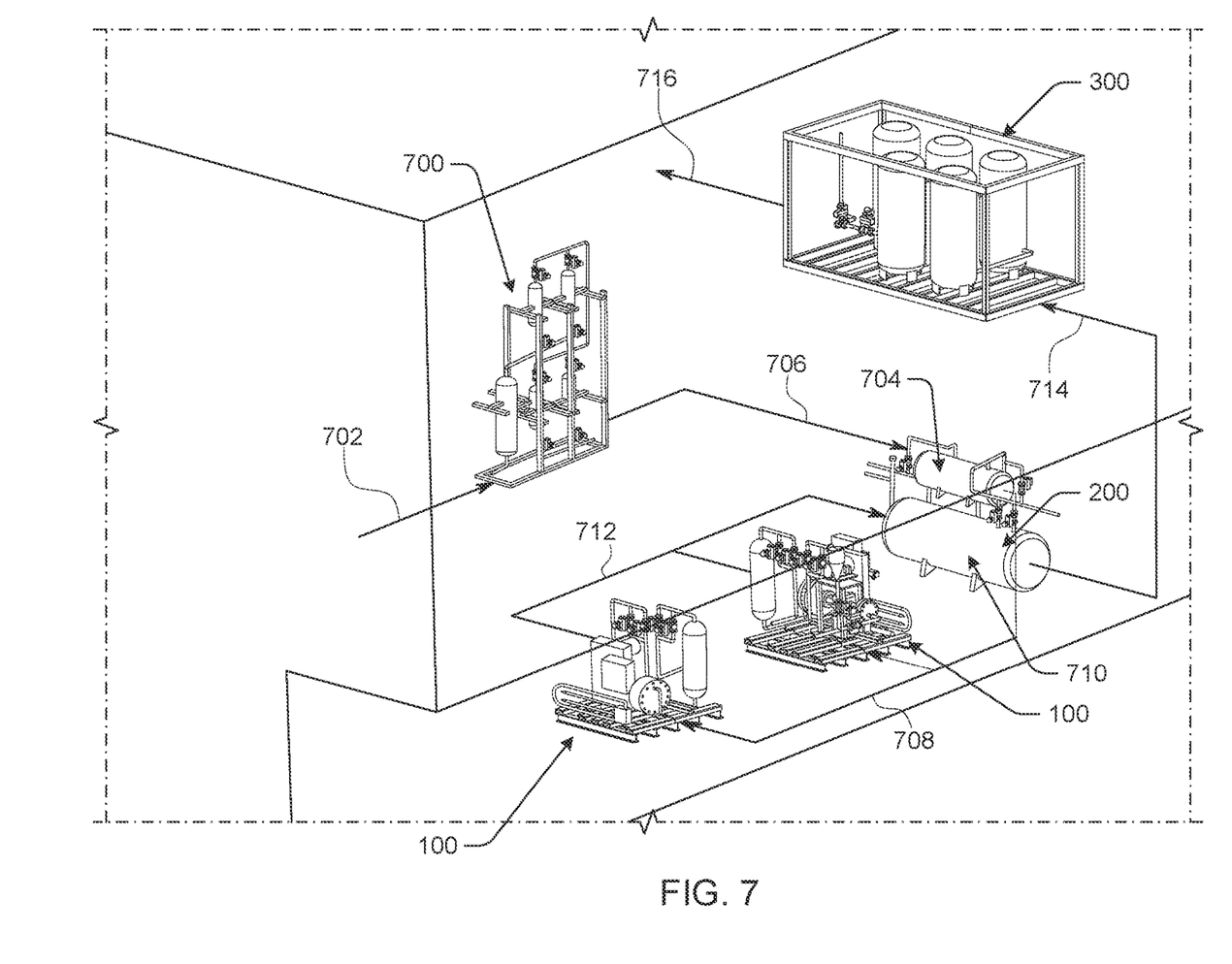
FIG. 7 illustrates an example placement of super modules within a reactor building, in accordance with some embodiments.

FIG. 7 illustrates an example layout of some example modules for a cover gas processing system within a nuclear plant construction site. According to some embodiments, the modules can be located within the nuclear plant construction site at any suitable location and, because the modules are largely self-contained and pre-assembled, can be placed and then coupled together through suitable fluid and electrical connections. In some embodiments, the modules are positioned within steel cells that have preformed openings to allow coupling the modules together to provide fluid and electrical piping and/or conduits.

As an example, one or more compressor modules 100 can be constructed in a factory setting, fully assembled into super modules in which the one or more compressor modules 100 are fully assembled and optionally coupled to other modules. The compressor modules 100 can be outfitted with cells (not shown), or portions of a cell to provide shielding for the module 100, and optionally provide protection during transport of the module 100 to the construction site. In a similar way, one or more tank modules 200, one or more charcoal delay bed modules 300, or one or more additional modules can be fully fabricated and assembled within a factory, and thereafter be separated into modules for transport. The modules may include a portion of a cell, or may include the entirety of the cell which can function as shipping support for the module, shielding for the module, and/or concrete forms for poured concrete shielding for the cell.

The modules may be coupled together through any suitable fluid, thermal, electrical, gas, or other coupling. For example, a vapor trap module 700 may be coupled to the reactor outlet 702. The vapor trap module 700 can be fluidically coupled to the vacuum tank 704 of the tank module 200 through a suitable conduit 706. The vacuum tank 705 may be coupled to the compressor modules 100, such as by coupling the compressor modules 100 in parallel with the vacuum tank 704 through a conduit 708. The compressor modules can be coupled to the surge and delay tank 710 through a suitable conduit 712. The surge and delay tank 710 can be coupled to the charcoal delay bed module 300 through a conduit 714, which can extend to the plant exhaust 716. In the illustrated configuration, the civil works and building structure is largely irrelevant to the fabrication, assembly, and placement of the illustrated modules. Once placed, the modules can be coupled together for suitable communication therebetween, such as fluid communication, electrical communication, and/or additional couplings to allow the systems to function and interact as desired.

Figure 8:
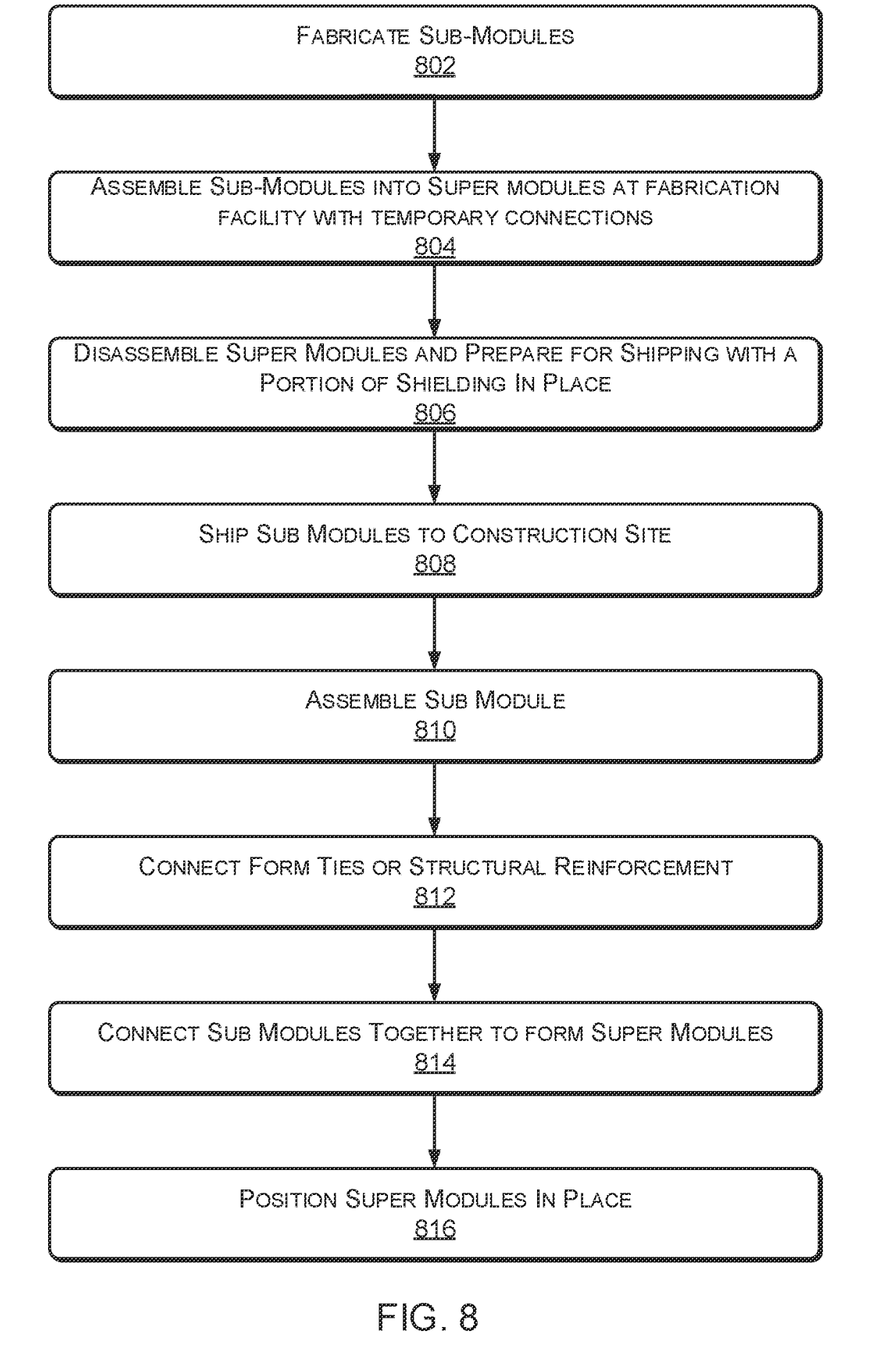
FIG. 8 illustrates a flow diagram for a method of fabricating modules and assembling super modules, in accordance with some embodiments.

With reference to FIG. 8, a flow diagram for a method of fabricating modules and constructing super modules is illustrated. At block 802, a sub-module is fabricated. In some embodiments, a sub-module is fabricated in a factory and may include attachment to a skid that allows the sub-module to be moved and/or manipulated through a lifting machine, such as a crane, forklift, pallet jack, or other lifting machine. In some embodiments, the skid is permanently connected to the module and remains in place throughout the useful life of the module, which may also facilitate removal and/or replacement of the module. A sub-module may additionally include a cell, or a portion of a cell.

At block 804, an optional step is to assemble two or more sub-modules into a super module at a fabrication facility. In some cases, the assembly relies upon temporary connections between components of the super module. The super module may be assembled to ensure that the sub-modules fit together. For example, in some embodiments, a compressor super module is assembled by coupling a compressor sub-module, including a skid, and portions of a cell that provide shielding around the compressor sub-module. Of course, other super modules may likewise be assembled and tested for fit and connections to other super modules.

At block 806, the super modules are disassembled and prepared for transport. In some cases, the cells are disassembled into multiple pieces to ensure the pieces fit within a transport envelope, such as a shipping or cargo container, or the like. In some cases, a steel cell functions as a shipping container to provide security and stability to the modules.

At block 808, the sub-modules are transported to a construction site through any suitable transport method, including air, ground, sea, and the like. In some cases, the cells or portion of a cell provide additional support and protection to the sub-modules therein.

At block 810, the sub-modules are assembled at the construction site. In some cases, the sub-modules are assembled on grade where assembly workers have unobstructed access to the sub-modules. In some cases, the sub-modules are located within a room of a building and are assembled within the room in which they will ultimately be installed.

At block 812, two or more sub-modules are positioned adjacent to one another and the cells may be connected together by form ties or other structure reinforcement that inhibits relative movement between the adjacent sub-modules, such as when liquid concrete is poured therebetween.

At block 814, two or more submodules are connected together to form super modules. The connection may include structural connections, fluid connections, electrical connections, thermal connections, or other desired connections to allow the super modules to function for their intended purposes.

At block 816, the super modules are positioned in place within the construction site. This may include placing super modules below grade, in reactor building rooms, or in adjacent buildings. In addition, the cells used to support, protect, and shield the sub-modules and/or super modules may be used as concrete forms to support retaining and forming liquid concrete as it is poured around the cells and allowed to harden. In these cases, the cells are left in place permanently. In some cases, concrete may be poured in between the cells prior to positioning the super modules in place, while in other cases, the super modules are positioned first and the concrete is then poured.

While FIG. 8 illustrates several blocks or steps, one or more of the blocks may be omitted, reordered, and other blocks or steps may be added. The disclosed blocks are illustrative of some embodiments for fabricating sub-modules at a fabrication facility, such as a factory, test-assembling the sub-modules and/or super modules, and then transporting the sub-modules to a construction site where they are assembled into super modules and positioned in place for installation. This process greatly improves the efficiency in fabricating delicate components and avoids much of the costly and inefficient on-site fabrication work.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of constructing a nuclear reactor, comprising:
fabricating one or more sub-modules in a manufacturing facility, the one or more sub-modules comprising a skid and a shielding;
assembling one or more sub-modules into one or more super modules using temporary connections at the manufacturing facility;
disassembling the super modules;
transporting the sub-modules to an installation site;
assembling, at the installation site, two or more of the one or more sub-modules using permanent connections;
installing concrete form ties between the two or more sub-modules;
welding the two or more sub-modules together to create a super module;
pouring concrete between the two or more sub-modules; and
installing the super module in place.

2. The method of claim 1, wherein the one or more sub-modules include one or more of a compressor module, a tank module, and a charcoal bed module.

3. The method of claim 1, wherein the shielding is made up of multiple pieces and further comprising the step of, at the installation site: welding the multiple pieces of shielding to the sub-module.

4. The method of claim 1, wherein transporting the sub-modules to the installation site comprises shipping the sub-modules by truck.

5. The method of claim 1, wherein a first submodule of the one or more submodules has a steel container permanently formed around the first submodule, the steel container having a preformed aperture.

6. The method of claim 5, wherein the first submodule comprises a pipe coupled to the preformed aperture.

7. The method of claim 1, wherein the step of pouring concrete between the two or more sub-modules is performed after the step of installing the super module in place.

8. A method of constructing a nuclear reactor, comprising:
fabricating one or more sub-modules in a manufacturing facility, the one or more sub-modules comprising a skid and a shielding;
assembling one or more sub-modules into one or more super modules using temporary connections at the manufacturing facility;
disassembling the super modules; and
transporting the sub-modules to an installation site;
wherein the shielding is made up of multiple pieces and further comprising the step of, at the installation site: welding the multiple pieces of shielding to the sub-module.

9. The method of claim 8, further comprising assembling, at the installation site, two or more of the one or more sub-modules using permanent connections;
installing concrete form ties between the two or more sub-modules;
welding the two or more sub-modules together to create a super module;
installing the super module in place; and
pouring concrete between the two or more sub-modules.

10. The method of claim 8, wherein the one or more sub-modules include one or more of a compressor module, a tank module, and a charcoal bed module.

11. The method of claim 8, wherein a first submodule of the one or more submodules has a steel container permanently formed around the first submodule, the steel container having a preformed aperture.

12. The method of claim 11, wherein the first submodule comprises a pipe coupled to the preformed aperture.

* * * * *